United States Patent

Matui et al.

[11] Patent Number: 5,952,586
[45] Date of Patent: Sep. 14, 1999

[54] DEVICE AND METHOD FOR ACCURATELY DETECTING TORQUE OF AUXILIARY DEVICE

[75] Inventors: Hirohito Matui; Mitsuo Inagaki, both of Okazaki, Japan

[73] Assignee: Nippon Soken, Inc., Nishio, Japan

[21] Appl. No.: 08/903,442

[22] Filed: Jul. 30, 1997

[30] Foreign Application Priority Data

Jul. 31, 1996 [JP] Japan ................................ 8-201539

[51] Int. Cl.[6] .................................................. G01L 3/02
[52] U.S. Cl. ............................................... 73/862.194
[58] Field of Search ..................... 73/862.194, 862.28, 73/862.29, 862.31

[56] References Cited

U.S. PATENT DOCUMENTS 3,992,932 11/1976 Venema ............................. 73/862.194
4,141,245 2/1979 Brandstetter ...................... 73/862.194

FOREIGN PATENT DOCUMENTS 63-031500 2/1988 Japan .
4-109134 4/1992 Japan .
6-034027 2/1994 Japan .

*Primary Examiner*—George Dombroske
*Assistant Examiner*—Jewel V. Thompson
*Attorney, Agent, or Firm*—Pillsbury Madison & Sutro LLP

[57] ABSTRACT

An alternator provides its output current waveform directly or via a current probe to a low pass filter and a high pass filter. The resulting waveform is provided to a half-wave rectifier and a comparator to obtain a rectangular waveform. The arithmetic circuit determines the number of clock pulses between rectangular waves to obtain the rotation speed of the alternator. The torque due to auxiliary devices is computed based on the ratio of the rotation speed of a crankshaft to the rotation speed of the alternator.

14 Claims, 5 Drawing Sheets

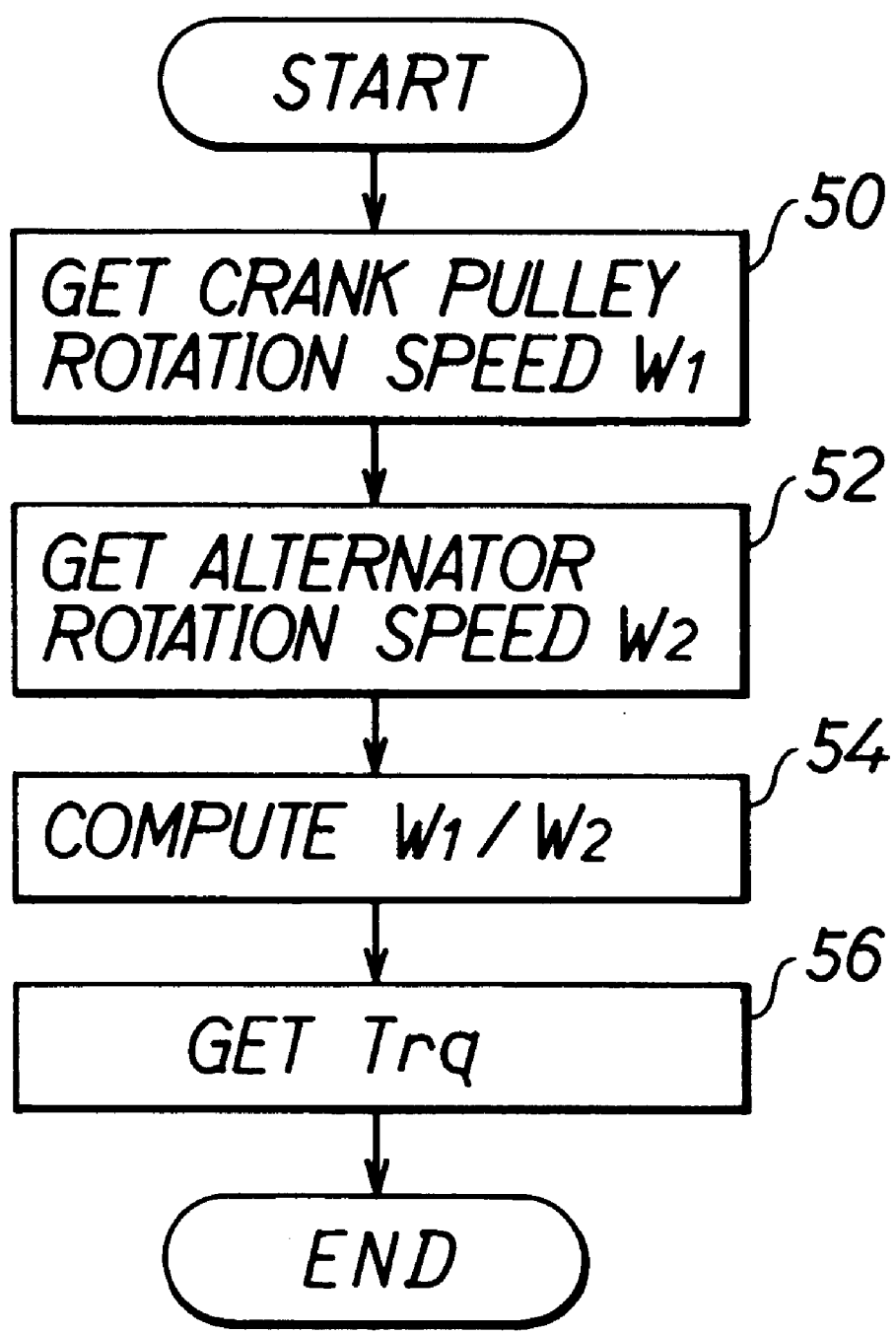

DEVICE AND METHOD FOR ACCURATELY DETECTING TORQUE OF AUXILIARY DEVICE

CROSS-REFERENCE TO RELATED APPLICATION

This application is related to and claims priority from Japanese Patent Application No. Hei-8-201539, the contents of which are hereby incorporated by reference.

BACKGROUND OF THE INVENTION

1. Field of the Invention

The present invention relates to an apparatus for detecting a magnitude of torque due to auxiliary devices that are driven by a rotational driving source. In particular, the present invention relates to a apparatus for detecting torque due to auxiliary devices such as an alternator, a compressor and the like that are driven by an internal combustion engine. The present invention also relates to a method for accurately detecting the magnitude of torque due to auxiliary devices.

2. Description of Related Art

A shaft of an internal combustion engine of a vehicle drives various auxiliary devices. A compressor of an air conditioner, an oil pump of an automatic transmission, an oil pump of a power steering device, an alternator, a fan and the like are examples of such auxiliary devices. Meanwhile, to lower the idle engine speed of the internal combustion engine, it will be necessary to accurately determine the load torque applied to the internal combustion engine by such auxiliary devices. Moreover, with more accurate detection of such load torque, the control of the automatic transmission becomes more precise and the operation of the transmission will be smoother. In addition, locking in of the air conditioner compressor can be promptly responded to when such locking is detected. Furthermore, the power steering device can be controlled to detect and issue a warning when a driver performs excessive steering operations.

One common method for detecting the amount of torque in the rotation shaft (driving shaft) detects the amount of torque based on elastic twisting in the rotation shaft that is in accordance with the amount of torque. For this purpose, as disclosed in Japanese Patent Laid Open Publication No. Hei-4-109134, a wire resistance strain gauge is installed in the rotation shaft to detect any slight twisting in the rotation shaft based on the change in the electrical resistance thereof with the amount of torque in the rotation shaft being computed based on such twisting.

In this way, in the aforementioned method, the strain gauge has to be installed on the rotation shaft using an adhesive or the like to measure the amount of twisting or the like. However, the output of the strain gauge varies greatly with respect to how and where it is installed on the rotation shaft and thus, the accuracy of measuring the amount of torque is greatly affected by the configuration of the strain gauge on the rotation shaft.

Moreover, because the rotation shaft to which the strain gauge is installed is rotating, there will be a need for a sliding mechanism such as a slip ring to receive the output signal (electric signal) from the strain gauge. However, such a sliding mechanism may adversely affect the reliability, the durability and the length of the usage lifetime of the strain gauge.

SUMMARY OF THE INVENTION

In view of the foregoing problems in the prior art, the present invention aims to provide a device for accurately measuring torque due to auxiliary devices. Moreover, the present invention aims to provide the device which gives accurate torque measurements that are not affected by its installment position and configuration and which is highly reliable and durable. Furthermore, the present invention aims to provide a method for accurately measuring torque due to auxiliary devices.

To achieve the foregoing aims, a first aspect of the present invention provides a torque determination device that has a rotating source, a driving pulley unit, an auxiliary pulley unit, a belt unit, a rotation speed measurement unit, a rotation speed determination unit and a torque computation unit. The driving pulley unit is coupled to the rotating source. The auxiliary pulley unit is coupled to an alternator that acts as an auxiliary device. The belt unit couples the driving pulley unit to the auxiliary pulley unit. The rotation speed measurement unit determines the rotation speed of the driving pulley unit. The rotation speed determination unit determines the rotation speed of the auxiliary pulley unit based on current flowing in the alternator. The torque computation unit determines torque applied by the alternator to the rotating source based on the rotation speed of the driving pulley unit and the rotation speed of the auxiliary pulley unit.

In this way, the torque determination device accurately determines the torque applied by the alternator to the rotating source regardless of its installment position and configuration. In addition, because the rotation speed of the auxiliary pulley unit is determined based on the current flowing in the alternator, there will be no need to provide a special-purpose sensor for measuring the rotation speed of the auxiliary pulley unit. Thus, the cost of the torque determination device can be kept at a minimum.

Another aspect of the present invention provides a method for computing the torque applied by an alternator to an engine. This method includes the steps of coupling a driving pulley unit to an engine, coupling a driven pulley unit to an alternator, coupling the driving pulley unit to the driven pulley unit using a belt unit, determining the rotation speed of the driving pulley unit, determining the rotation speed of the driven pulley unit based on electric current in the alternator and determining the torque based on the rotation speed of the driving pulley unit and the rotation speed of the driven pulley unit.

BRIEF DESCRIPTION OF THE DRAWINGS

Additional objects and advantages of the present invention will be more readily apparent from the following detailed description of preferred embodiments thereof when taken together with the accompanying drawings in which:

FIG. 6 is a flow chart of a procedure executed by the torque computation circuit for computing the torque due to the auxiliary device;

DETAILED DESCRIPTION OF PRESENTLY PREFERRED EXEMPLARY EMBODIMENTS

Preferred embodiments of the present invention are described hereinafter with reference to the accompanying drawings.

Figure 1:
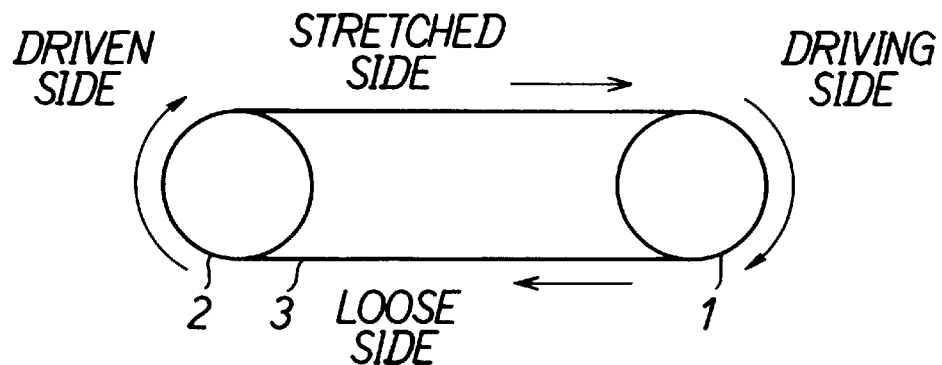
FIG. 1 is a diagram illustrating a principle for computing torque due to an auxiliary device according to the present invention.

The principle of computing torque according to the present invention is described hereinafter with reference to FIG. 1. In the same figure, a belt 3 connects a driving pulley 1, which acts as the source of rotation, and a driven pulley 2 that is driven by the action of the driving pulley 1. The pulling action of the driving pulley 1 on the belt 3 makes the upper side of the belt 3 stretch and the lower side of the same belt 3 slacken. If there is no torque in the side of the driven pulley 2, the belt 3 will not stretch and the rotation speed of the driven pulley 2 will be equal to that of the driving pulley 1. However, when there is torque due to the driven pulley 2, the belt 3 stretches at its upper side and the rotation speed of the driven pulley 2 becomes smaller than that of the driving pulley 1. That is, elastic slip due to a change in the tension in the belt 3 causes the rotation speed of the driven pulley 2 to become smaller than that of the driving pulley 1. An accessory load torque Trq due to the driven pulley 2 is expressed by the following Eq. (1).

$$Trq = R_1 \times K \times (R_1/R_2) \times (W_1/W_2) - 1) \quad (1)$$

In Eq. (1), $W_1$ represents the rotation speed of the driving pulley 1, $W_2$ represents the rotation speed of the driven pulley 2, K indicates the coefficient of elasticity of the belt 3, $R_1$ represents the radius of the driving pulley 1, and $R_2$ represents the radius of the driven pulley 2.

According to Eq. (1), the load torque Trq and the ratio $W_1/W_2$ of the rotation speeds follow a linear relationship. In this way, the load torque Trq can be obtained based on the ratio of the rotation speed $W_1$ of the driving pulley 1 to the rotation speed $W_2$ of the driven pulley 2.

Figure 2:
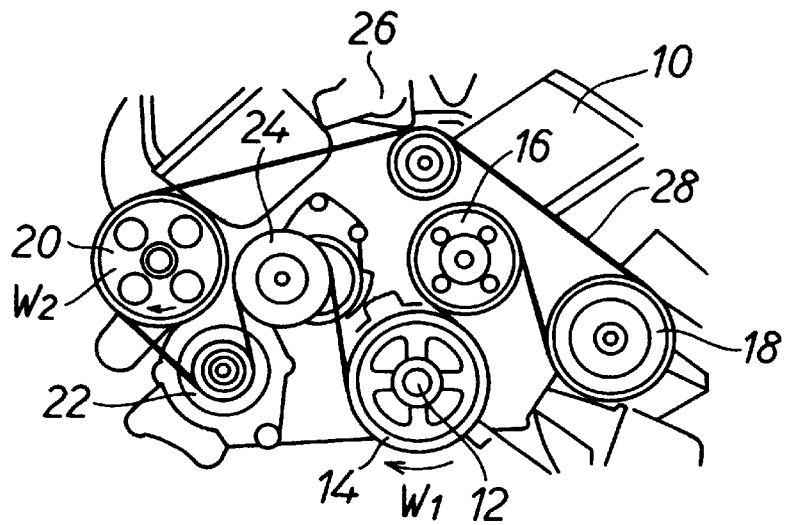
FIG. 2 is a diagram illustrating an arrangement of pulleys inside an internal combustion engine.

The calculation of the load torque due to the auxiliary device according to the principle mentioned above is explained in detail hereinafter. In FIG. 2, an internal combustion engine 10, which forms the source of rotational movement, has a crankshaft 12 which is provided with a crank pulley 14 that acts as the driving pulley 1. An auxiliary device pulley 16 drives a fan (not shown). An auxiliary device pulley 18 drives a compressor of an air conditioner (not shown). An auxiliary device pulley 20 drives a hydraulic pump of a power steering device (not shown). An auxiliary device pulley 22 drives an alternator 30 shown in FIGS. 4 and 7. In the same FIG. 2, a pulley 24 acts as a tension pulley while a pulley 26 acts as an idler pulley. A belt 28 connects the pulleys 14, 16, 18, 20, 22, 24 and 26. The crankshaft 12 rotates in the clockwise direction as indicated by an arrow in FIG. 2 at the rotation speed of $W_1$. The auxiliary device pulleys 16, 18, 20 and 22 rotate with the rotation of the crank pulley 14. In other words, the crankshaft 12 drives the auxiliary devices. Accordingly, the load torque due to the auxiliary devices can be determined based on the rotation speed $W_2$ of one auxiliary device using Eq. (1) mentioned above.

Figure 3:
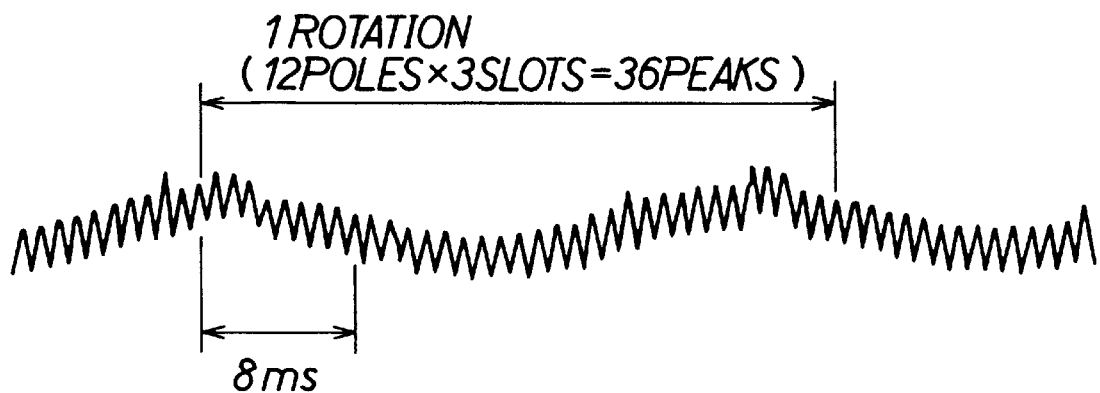
FIG. 3 is a graph of a current waveform of an alternator.

Here, the first preferred embodiment of the present invention focuses on the alternator 30 (shown in FIGS. 4 and 7 which are explained later) as the auxiliary device. In this way, the load torque due to the auxiliary device (in this case, the alternator 30) is computed based on the rotation speed of the alternator 30, which in turn is determined based on the fluctuation in the current generated by the alternator 30. The detection of the rotation speed of the alternator 30 based on the fluctuation of its generated current is explained hereinafter. As shown in FIG. 3, the generated current of the alternator 30 fluctuates together with the rotation of its rotor. That is, change in the generated current of the alternator 30 is synchronous with the rotation of its rotor. Here, the alternator has 12 poles and 3 slots, and thus, as shown in FIG. 3, the alternator 30 generates a current which has 36 peaks (=12×3) for each full rotation. The waveform of the current generated by the alternator 30 contains high and low frequency noise components that need to be removed.

Figure 4:
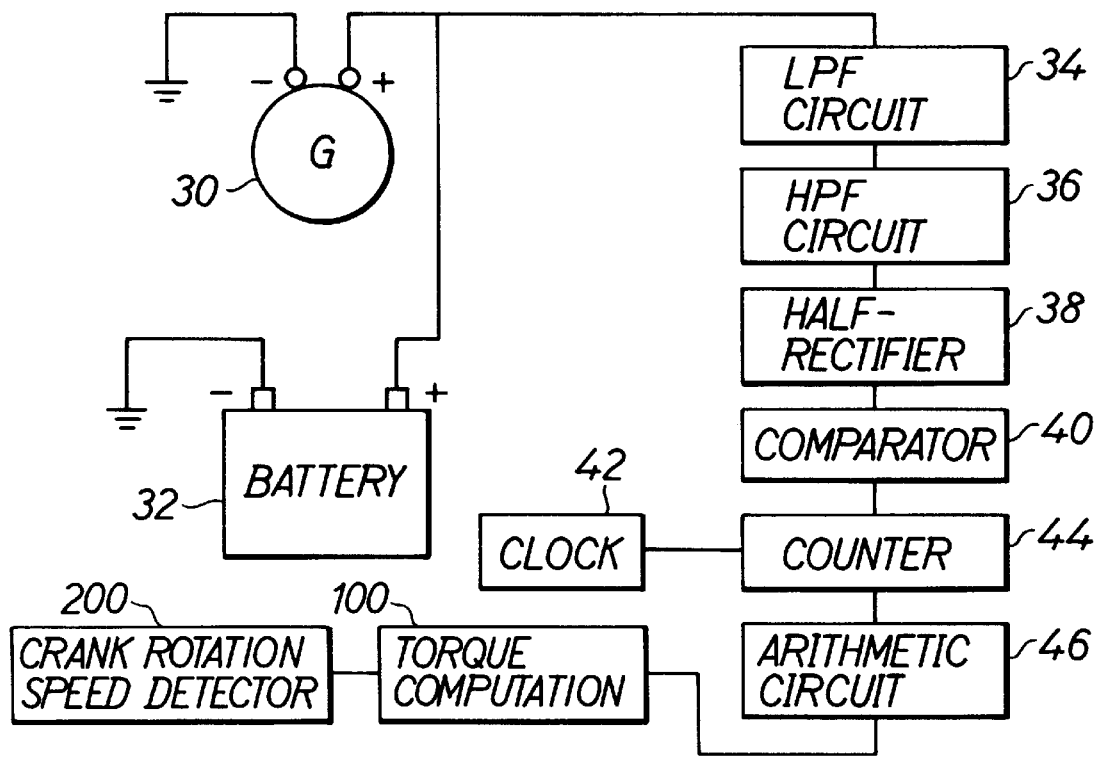
FIG. 4 is a block diagram showing an alternator speed determination circuit for determining rotation speed of the alternator and a torque computation circuit according to the first preferred embodiment.

In this connection, an alternator speed determination circuit for determining the rotation speed of the alternator 30 based on fluctuations in its generated current is described hereinafter. According to the present embodiment, a block diagram of the alternator rotation speed determination circuit is shown in FIG. 4. In the present embodiment, voltage that is in accordance with the generated current of the alternator 30 is directly provided to the alternator rotation speed determination circuit of FIG. 4. As shown in FIG. 4, one terminal of the alternator 30 is connected to ground while another terminal is connected to a positive terminal of a battery 32. The rotation speed determination circuit for the alternator 30 includes a low pass filter circuit 34, a high pass filter circuit 36, a half-wave rectifier 38, a comparator 40, a reference clock generator 42, a counter 44 and an arithmetic circuit 46.

Figure 5A:
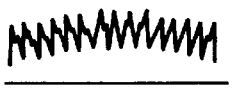
FIGS. 5A–5E are graphs illustrating waveforms of signals from the alternator speed determination circuit of FIG. 4.
Figure 5B:
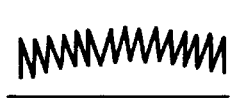
Figure 5C:
Figure 5D:
Figure 5E:

As explained before and as shown in FIG. 3, the alternator 30 generates a current whose waveform has 36 peaks per each rotation of its rotor. The current generated by the alternator 30 is convoluted with approximately 10 kHz of high frequency noise components and 30 Hz of low frequency noise components. When the alternator rotation speed determination circuit receives the signal having a waveform shown in FIG. 5A (that is, the output signal of the alternator 30 convoluted with the noise components), its low pass filter circuit 34 removes the high-frequency noise components from the signal of FIG. 5A to generate a signal having the waveform shown in FIG. 5B. Thereafter, the low pass filter circuit 34 provides its output signal to the high pass filter circuit 36 which removes the low-frequency noise components from such signal to generate the signal shown in FIG. 5C. Then, the half-wave rectifier 38 receives the output signal of the high pass filter circuit 36 and removes the negative components from such output signal to generate the signal whose waveform is shown in FIG. 5D. The comparator 40 transforms the output signal of the half-wave rectifier 38 into a signal having rectangular waveform shown in FIG. 5E. The counter 44 counts the number of clock pulse signals from the reference clock generator 42 for a series of rectangular waveform peaks shown in FIG. 5E. The arithmetic circuit 46 computes the rotation speed of the auxiliary device (that is, the alternator 30) based on the intervals between peaks of the rectangular waves, i.e., the number of clock pulse signals. The alternator rotation speed determination circuit (in particular, the arithmetic circuit 46) corresponds to the rotation speed determination unit in the appended claims. As shown in FIG. 4, the arithmetic circuit 46 provides its computation results to a torque computation circuit 100 that follows a procedure shown in FIG. 6 to compute the torque due to the alternator 30. This torque computation circuit 100 may be formed of a microprocessor or the like.

FIG. 6 shows the procedure the torque computation circuit 100 executes for computing the auxiliary device torque Trq based on the rotation speed $W_2$ of the alternator 30 detected by the alternator rotation speed determination circuit. In this procedure, step 50 computes the rotation speed $W_1$ of the crank pulley 14. Known devices may be used for determining the rotation speed of the crank pulley 14. For example, as shown in FIG. 4, the torque computation circuit 100 receives a signal from a crank rotation speed detector 200. The crank rotation speed detector 200 may be a crank angular sensor used in controlling the internal combustion engine 10 and for determining the rotation speed of the crank pulley 14. In particular, this type of crank angular sensor may be formed as an electromagnetic pickup or a Hall-effect device and may be disposed to face a target for detection (i.e., a magnet) provided on the crankshaft 12. The target for detection rotates together with the rotation of the crankshaft 12 and with this rotation, the state of the crank angular sensor changes. As a result, the crank angular sensor generates pulse signals in accordance with the rotation speed of the crankshaft 12. The rotation speed of the crankshaft 12, i.e., the rotation speed $W_1$ of the crank pulley 14, can be obtained from the time interval between such pulse signals.

After step 50, control goes to step 52 which determines the rotation speed $W_2$ of the alternator 30 based on the computation results of the arithmetic circuit 46 shown in FIG. 4. Subsequent step 54 computes the ratio of the rotation speed $W_1$ of the crank pulley 14 to the rotation speed $W_2$ of the alternator 30. Step 56 computes the auxiliary device load torque Trq based on Eq. (1).

Figure 11:
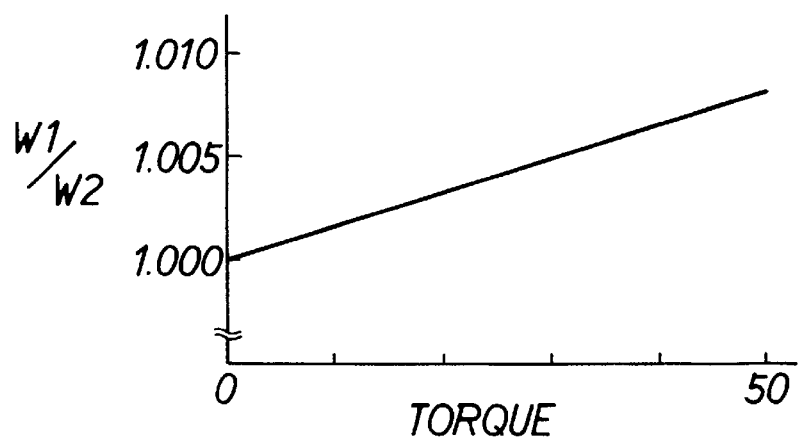
FIG. 11 is a graph showing the relationship between the ratio of the rotation speed of a crank pulley to the rotation speed of a pulley of the auxiliary device and the load torque due to the auxiliary device.

As explained before, the load torque Trq and the rotation speed ratio $W_1/W_2$ follow a linear relationship. For example, FIG. 11 shows the relationship between the load torque Trq and the rotation speed ratio $W_1/W_2$ when the driving pulley 1 and the driven pulley 2 have the same radius (that is $R_1/R_2=1$). In this way, this relationship between the load torque Trq and the rotation speed ratio $W_1/W_2$ may be stored as a map in a ROM (not shown) so that the load torque Trq can be obtained easily based on the computed rotation speed ratio $W_1/W_2$. The torque computation circuit 100 corresponds to the torque computation unit in the appended claims.

A second preferred embodiment of the present invention is explained hereinafter.

Figure 7:
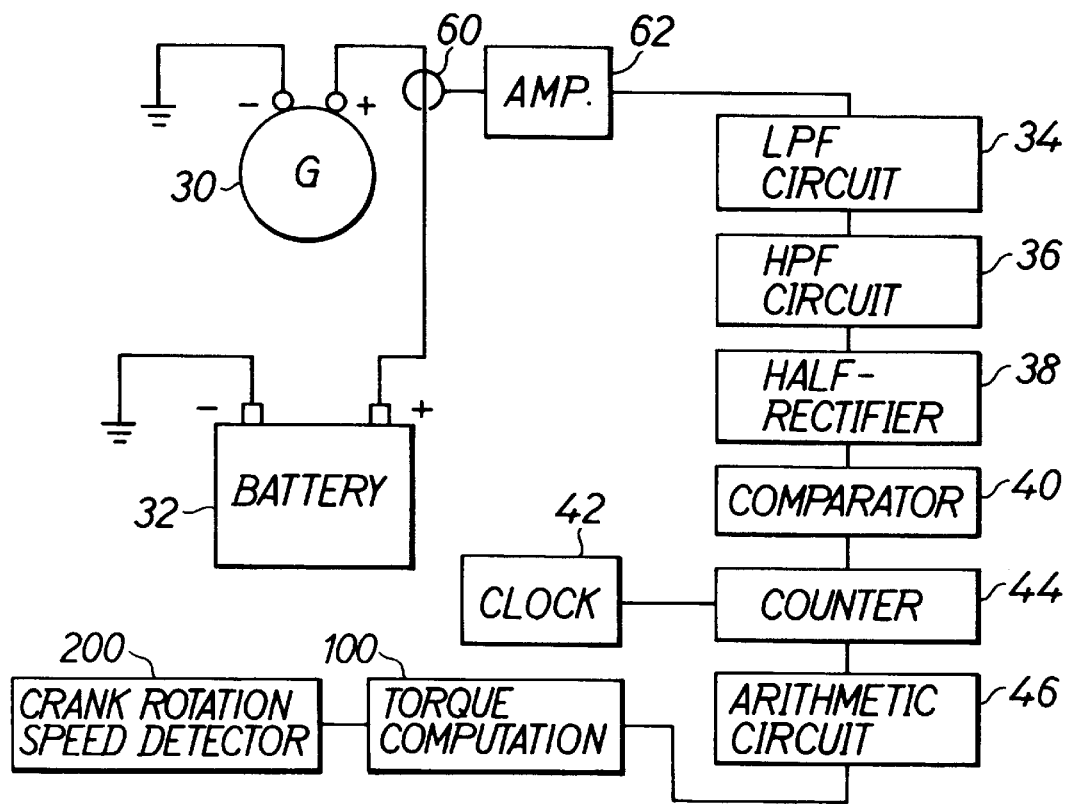
FIG. 7 is a block diagram showing the alternator speed determination circuit for determining rotation speed of the alternator and the torque computation circuit according to a second preferred embodiment of the present invention.
Figure 8A:
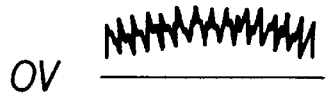
FIGS. 8A–8E are graphs illustrating waveforms of signals from the alternator speed determination circuit of FIG. 7.
Figure 8B:
Figure 8C:
Figure 8D:
Figure 8E:

In the first preferred embodiment, the alternator rotation speed determination circuit of FIG. 4 directly receives the output voltage from the alternator 30 to compute the rotation speed of the alternator 30. On the other hand, as shown in FIG. 7, the alternator rotation speed determination circuit according to the second preferred embodiment is provided with a current probe 60. The current probe 60 includes a core that generates a magnetic field in accordance with the current flowing in the alternator 30 and a coil that generates a current in accordance with the magnetic field generated by the core. The magnetic field generated by the core varies in synchronization with the rotation speed of the alternator 30. The current generated by the current probe 60 is amplified by an amplifier 62, which provides the amplified signal shown in FIG. 8A to the low pass filter circuit 34. Thereafter, with reference to FIGS. 8B–8E, the rotation speed $W_2$ of the alternator 30 is determined by the circuits 34 to 46 in the same way as in the first preferred embodiment. Moreover, the arrangements of the torque computation circuit 100 and the crank rotation speed detector 200 are the same as those in the first preferred embodiment.

Although the present invention has been fully described in connection with preferred embodiments thereof with reference to the accompanying drawings, it is to be noted that various changes and modifications will become apparent to those skilled in the art.

Figure 9:
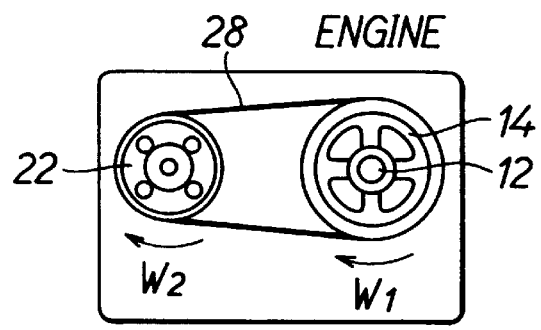
FIGS. 9 and 10 are diagrams illustrating various arrangements of pulleys.
Figure 10:
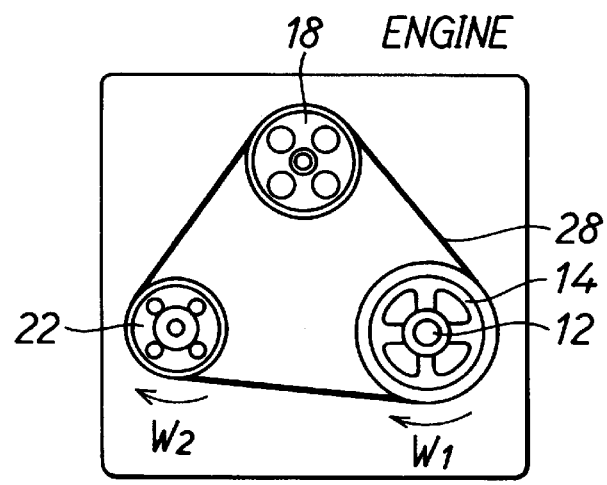

While FIG. 2 shows one layout of pulleys in the internal combustion engine, it goes without saying that the present invention can be applied to other pulley arrangements. For example, the present invention can be applied to the pulley arrangement shown in FIG. 9 wherein the crank pulley 14 on the crankshaft 12 and the pulley 22 of the alternator 30 are connected by the belt 28. Moreover, the present invention can also be applied to the pulley arrangement shown in FIG. 10 wherein, in addition to the crank pulley 14 and the pulley 22, an additional pulley (e.g., the pulley 18 of the air conditioner compressor) is connected to the belt 28.

Such changes and modifications are to be understood as being within the scope of the present invention as defined by the appended claims.

What is claimed is:

1. A torque determination device comprising:

a rotating source;

a driving pulley unit coupled to said rotating source;

an auxiliary pulley unit coupled to an alternator;

a belt unit coupling said driving pulley unit to said auxiliary pulley unit;

a rotation speed measurement unit for determining a rotation speed of said driving pulley unit;

a rotation speed determination unit for determining a rotation speed of said auxiliary pulley unit based on current flowing in said alternator; and a torque computation unit for determining torque applied by said alternator to said rotating source based on said rotation speed of said driving pulley unit and said rotation speed of said auxiliary pulley unit.

2. A torque determination device according to claim 1, wherein said torque computation unit determines said torque based on a ratio of said rotation speed of said driving pulley unit to said rotation speed of said auxiliary pulley unit.

3. A torque determination device according to claim 1, wherein:

said belt unit couples said driving pulley unit and said auxiliary pulley unit to couple said alternator with said rotating source, and said torque computation unit determines said torque based on said rotation speed of said driving pulley unit, said rotation speed of said auxiliary pulley unit, a radius of said driving pulley unit and a radius of said auxiliary pulley unit.

4. A torque determining device comprising:

a rotating source;

a belt unit coupling said rotating source to an alternator;

a rotation speed determination unit for determining a rotation speed of said alternator based on a current in said alternator, said rotation speed of said alternator being responsive to elastic slips of said belt unit; and a torque computation unit for determining torque applied by said alternator to said rotating source based on said rotation speed of said alternator.

5. A torque determination device according to claim 4, said device further comprising a rotation speed measurement unit for determining a rotation speed of said rotating source, wherein said torque computation unit determines said torque based on said rotation speed of said alternator and said rotation speed of said rotating source.

6. A torque determination device according to claim 5, wherein said torque computation unit determines said torque based on a ratio of said rotation speed of said rotating source to said rotation speed of said alternator.

7. A torque determination device according to claim 5, further comprising:

a driving pulley unit coupled to said rotating source; and a driven pulley unit coupled to said alternator, wherein:

said belt unit couples said driving pulley unit and said driven pulley unit to couple said alternator with said rotating source, and said torque computation unit determines said torque based on said rotation speed of said alternator, said rotation speed of said rotating source, a radius of said driving pulley unit, and a radius of said driven pulley unit.

8. A torque determination device for determining torque applied by an auxiliary device to a rotating source that drives said auxiliary device, said torque determination device comprising:

a driving pulley unit coupled to a rotating source;

an auxiliary pulley unit coupled to an auxiliary device;

a belt unit coupling said driving pulley unit to said auxiliary pulley unit;

a rotation speed measurement unit for determining a rotation speed of said driving pulley unit;

a rotation speed determination unit for determining a rotation speed of said auxiliary pulley unit; and a torque computation unit for determining torque applied by said auxiliary device to said rotating source based on said rotation speed of said driving pulley unit and said rotation speed of said auxiliary pulley unit.

9. A method for computing torque applied by an alternator to an engine, said method comprising:

coupling a driving pulley unit to an engine;

coupling a driven pulley unit to an alternator;

coupling said driving pulley unit to said driven pulley unit using a belt unit;

determining a rotation speed of said driving pulley unit;

determining a rotation speed of said driven pulley unit based on electric current in said alternator; and determining torque applied by said alternator to said engine based on said rotation speed of said driving pulley unit and said rotation speed of said driven pulley unit.

10. A torque determination device according to claim 1, wherein said torque computation unit comprises a mechanism for computing said torque applied by said alternator to said rotating source as a function of $(R_1/R_2) \times (W_1/W_2)$.

11. The method according to claim 9, wherein said torque is computed based upon $(R_1/R_2)$ and $(W_1/W_2)$.

12. The method according to claim 11, wherein said torque is determined based upon a product of $(R_1/R_2)$ and $(W_1/W_2)$.

13. The method according to claim 12, wherein $Trq = R_1 K ((R_1/R_2)(W_1/W_2)-1)$, where Trq represents torque, $R_1$ represents a radius of said driving pulley unit, $R_2$ represents a radius of said driven pulley unit, $W_1$ represents a rotation speed of said driving pulley unit, and $W_2$ represents a rotation speed of said driven pulley unit, and K represents a coefficient of elasticity of said belt unit.

14. A torque determination device comprising:

a rotating source;

a driving pulley unit coupled to said rotating source;

an auxiliary pulley unit coupled to an alternator;

a belt unit coupling said driving pulley unit to said auxiliary pulley unit, said belt unit comprising a stretching portion;

a rotation speed measurement unit for determining a rotation speed of said driving pulley unit;

a rotation speed determination unit for determining a rotation speed of said auxiliary pulley unit based on current flowing in said alternator;

a torque computation unit for determining torque applied by said alternator to said rotating source based on said rotation speed of said driving pulley unit and said rotation speed of said auxiliary pulley unit; and an auxiliary device other than said alternator, said auxiliary device being disposed between said rotating source and said alternator and in contact with said stretching portion of said belt unit so as to be driven by said rotating source through a force translated by said belt unit.

* * * * *